(12) United States Patent
Ott

(10) Patent No.: US 7,868,995 B2
(45) Date of Patent: Jan. 11, 2011

(54) DEVICE FOR SOUNDPROOFING MOTION PICTURE CAMERAS

(75) Inventor: Franz Ott, Guntramsdorf (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 282 days.

(21) Appl. No.: 12/226,246

(22) PCT Filed: Apr. 10, 2007

(86) PCT No.: PCT/EP2007/003354

§ 371 (c)(1),
(2), (4) Date: Oct. 9, 2008

(87) PCT Pub. No.: WO2007/118700

PCT Pub. Date: Oct. 25, 2007

(65) Prior Publication Data

US 2009/0059171 A1    Mar. 5, 2009

(30) Foreign Application Priority Data

Apr. 11, 2006 (DE) .................. 10 2006 017 750

(51) Int. Cl.
  *G03B 31/00* (2006.01)
(52) U.S. Cl. .......................................... 352/35
(58) Field of Classification Search .......... 352/242, 352/243, 244, 34, 35; 348/373
  See application file for complete search history.

(56) References Cited

U.S. PATENT DOCUMENTS

| | | | | |
|---|---|---|---|---|
| 2,088,714 | A * | 8/1937 | Mitchell | 352/35 |
| 2,180,683 | A * | 11/1939 | Miller et al. | 352/35 |
| 3,160,227 | A * | 12/1964 | Hautala | 181/200 |
| 3,331,653 | A * | 7/1967 | Blaschek et al. | 352/35 |

(Continued)

FOREIGN PATENT DOCUMENTS

AT            368 300            9/1982

(Continued)

OTHER PUBLICATIONS

International Search Report, dated Nov. 7, 2007, corresponding to PCT/EP2007/003354.

(Continued)

*Primary Examiner*—William C Dowling
(74) *Attorney, Agent, or Firm*—Christie, Parker & Hale LLP

(57) ABSTRACT

A motion picture camera is provided. The motion picture camera having a camera housing that has an objective carrier which is arranged in the recording beam path of the motion picture camera and on which a recording optics can be fastened, having a camera frame that is arranged in the camera housing and which carries noise-producing parts of the camera mechanism, forms an image plane for the motion picture film, and is suspended on the camera housing at least two upper connecting elements arranged in the front area of the motion picture camera above and on both sides of the image center of the motion picture camera, and is supported on the camera housing with a lower connecting element arranged in the front area of the motion picture camera below the image center, and having a device for soundproofing.

18 Claims, 6 Drawing Sheets

U.S. PATENT DOCUMENTS

| | | | |
|---|---|---|---|
| 4,121,886 A * | 10/1978 | Gottschalk | 352/35 |
| 4,174,157 A * | 11/1979 | Gottschalk | 352/35 |
| 4,536,066 A * | 8/1985 | Bauer | 352/35 |
| 4,577,944 A * | 3/1986 | Grosser et al. | 352/35 |
| 4,816,857 A * | 3/1989 | Blaschek | 396/529 |
| 5,067,808 A | 11/1991 | Alscher | |
| 5,237,352 A * | 8/1993 | Grosser et al. | 352/35 |
| 5,706,074 A * | 1/1998 | Kohler et al. | 352/35 |
| 5,729,782 A * | 3/1998 | Murakami | 396/418 |
| 6,266,124 B1 * | 7/2001 | Wallner et al. | 352/35 |

FOREIGN PATENT DOCUMENTS

| | | |
|---|---|---|
| CH | 643 369 A5 | 5/1984 |
| DE | 35 38 827 A1 | 6/1986 |
| DE | 39 18 698 C1 | 11/1990 |
| DE | 40 28 540 A1 | 3/1992 |
| DE | 40 28 540 C2 | 3/1992 |
| DE | 44 43 255 A1 | 11/1994 |
| DE | 196 38 730 C1 | 10/1997 |
| DE | 196 31 553 A1 | 1/1998 |

OTHER PUBLICATIONS

English translation of International Preliminary Report on Patentability for corresponding International Application No. PCT/EP2007/003354, dated Nov. 13, 2008, 6 pages.

* cited by examiner

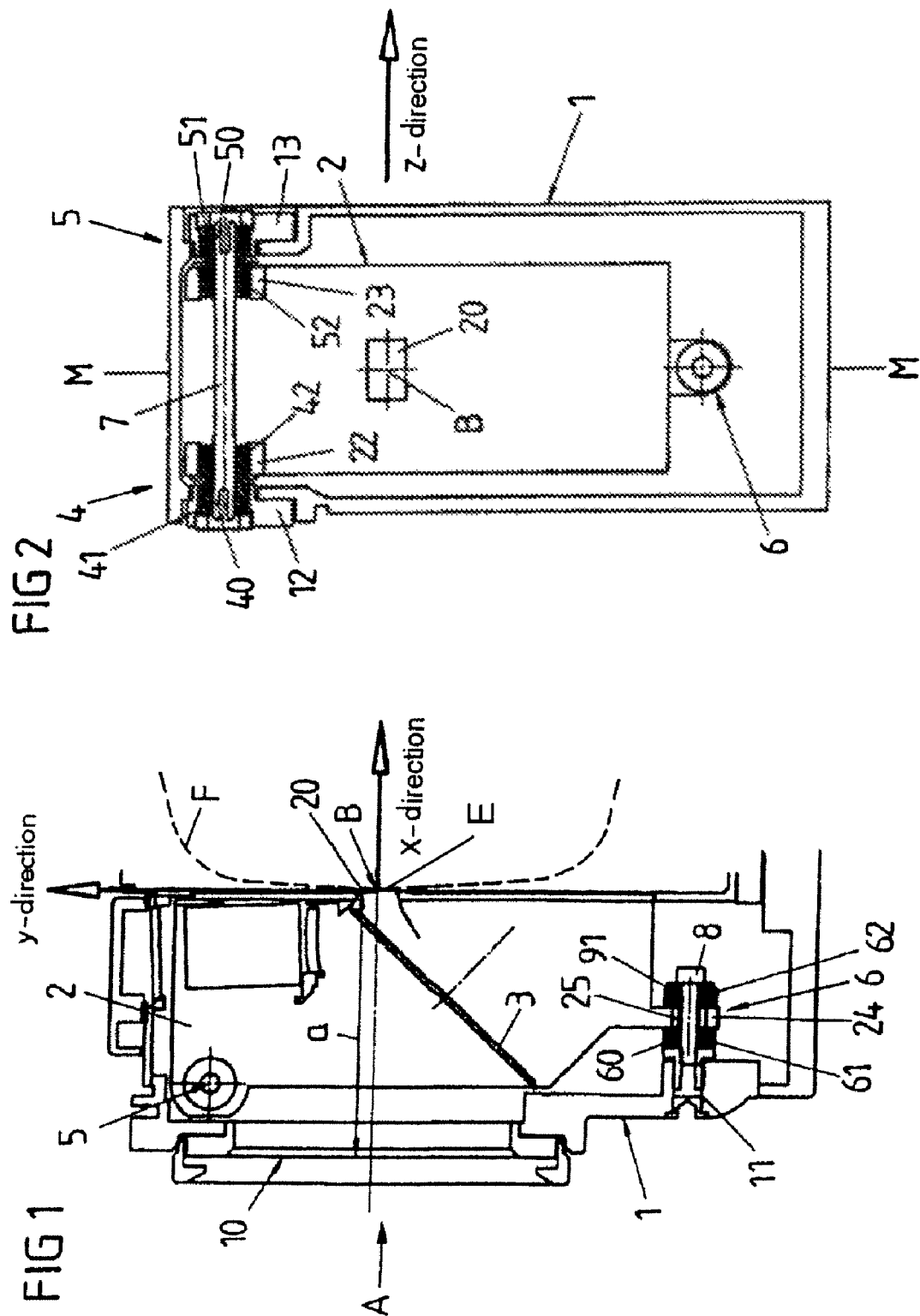

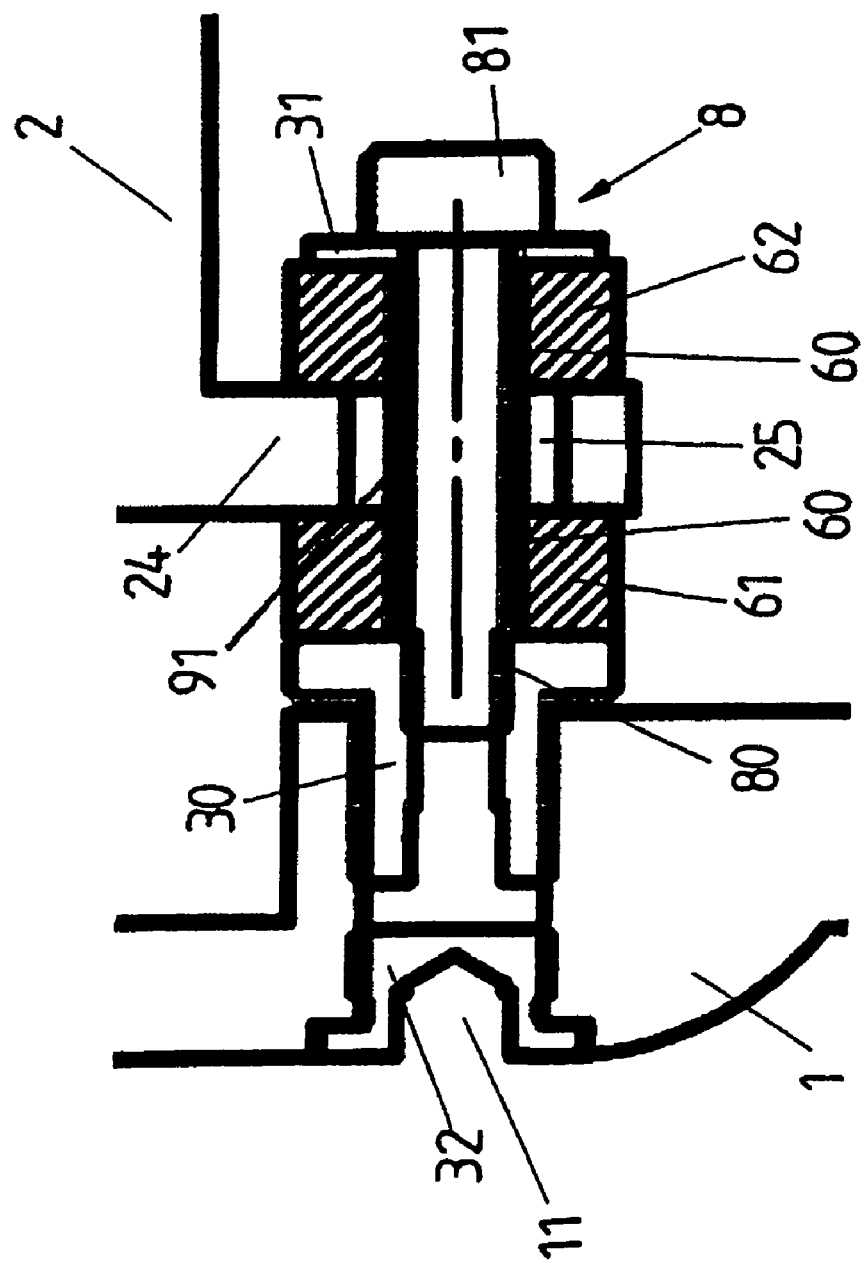

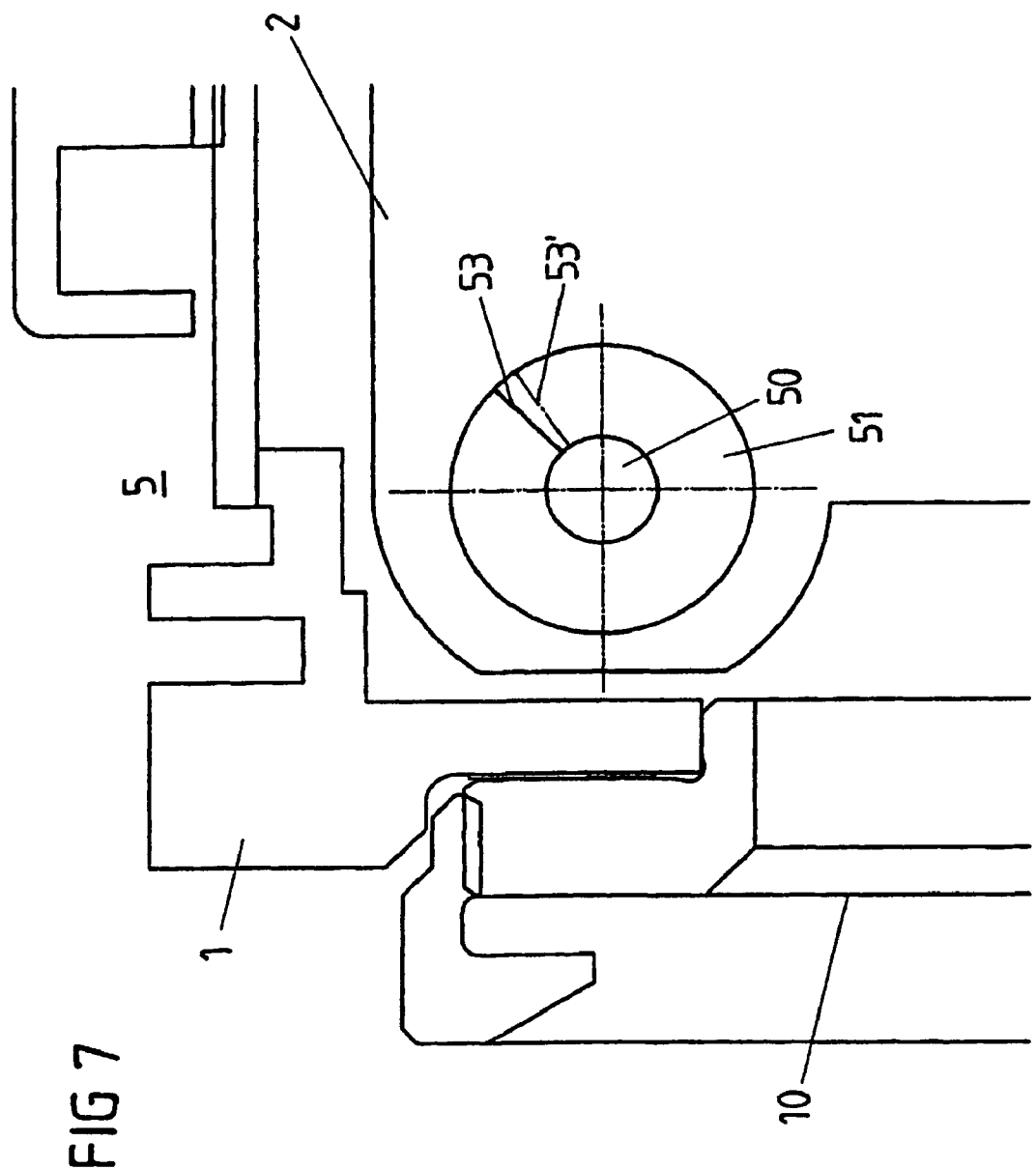

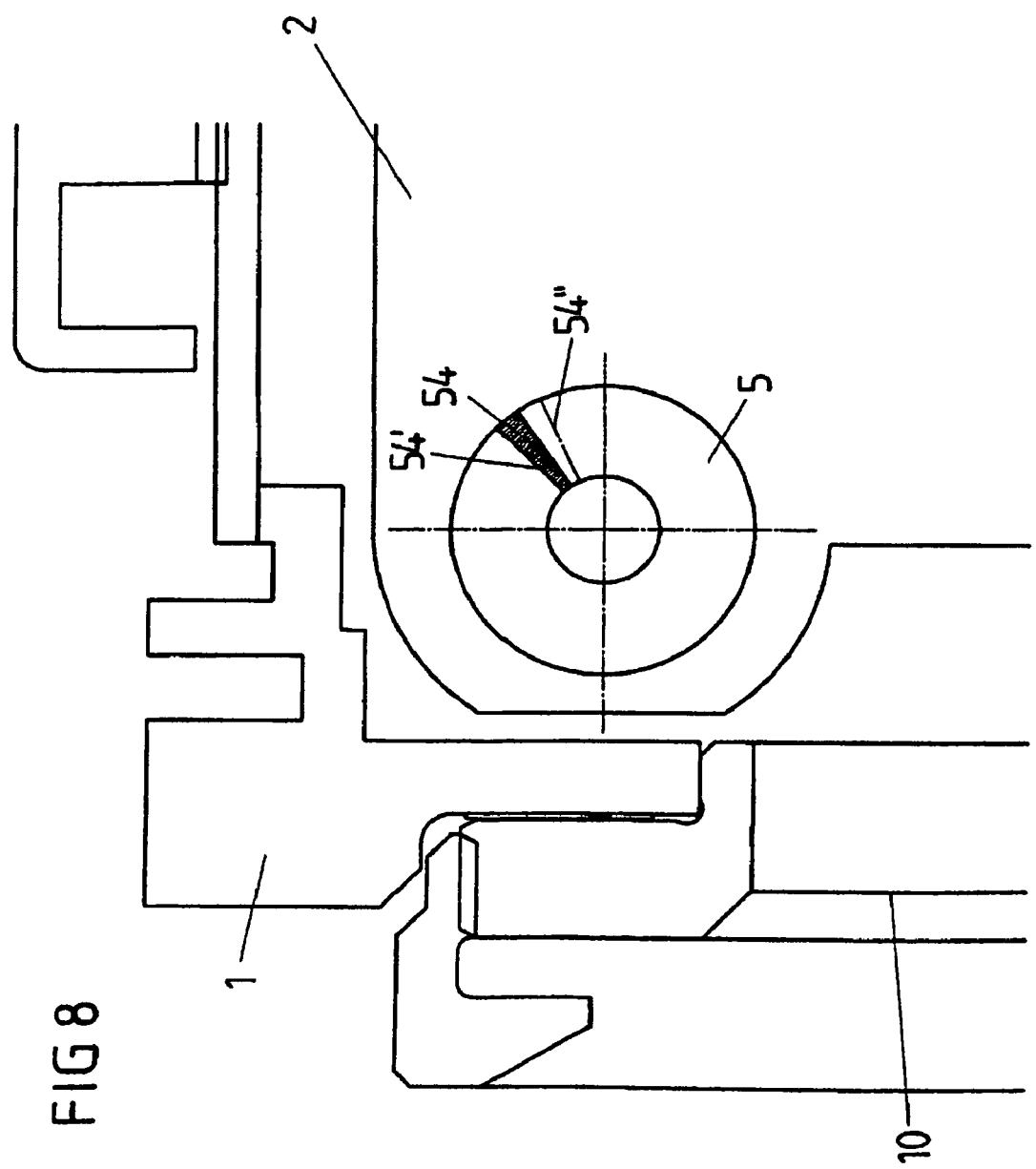

DEVICE FOR SOUNDPROOFING MOTION PICTURE CAMERAS

CROSS-REFERENCE TO A RELATED APPLICATION

This application is a National Phase Patent Application of International Patent Application Number PCT/EP2007/003354, filed on Apr. 10, 2007, which claims priority of German Patent Application Number 10 2006 017 750.9, filed on Apr. 11, 2006.

BACKGROUND

The invention relates to a device for soundproofing motion picture cameras.

Motion picture cameras have motor and gear devices for the continuous transport of a motion picture film between a film cassette and the motion picture camera, for the intermittent transport of the motion picture film along an image window in which the motion picture film is exposed, and for a rotating diaphragm device with the aid of which the beam path from the recording objective to the image window is interrupted during the film transport. These motor and gear devices produce mechanical vibrations that reach the camera housing as air-borne and structure-borne noise, and are radiated there to the environment, thus causing interfering or unacceptable ambient noises during sound film recordings. In order to minimize the self-noise level of a motion picture camera, it is therefore necessary to prevent the transmission of these unavoidable vibrations to the outer skin of the motion picture camera.

For the purpose of soundproofing or the suppression of sound, insulating materials such as rubber and the like are inserted between the movable parts of the film recording camera and the camera housing, but they have the disadvantage of a low mechanical stability, and so there is a need for frequent readjustment, since the camera objective determining the focal point plane is fastened on the camera housing, while the image window that determines the image plane for exposure of the motion picture film is part of the movable parts of the motion picture camera, and so every variation in the clearance between the camera housing and the camera frame carrying the movable parts of the motion picture camera causes instances of image blurring and/or image shifts.

U.S. Pat. No. 4,174,157 A discloses a motion picture camera having a camera housing that has an objective fastening, and a camera frame that is arranged inside the camera housing and on and in which the movable parts of the motion picture camera that produce noise are arranged. Provided between the camera frame and the camera housing are connecting elements that absorb sound and have an externally threaded pin that can be screwed into the camera housing and/or into the camera frame and is held by an internally threaded socket between which and an externally threaded bearing bush, a hollow cylindrical elastomer insert is provided.

The externally threaded pin, the internally threaded socket, the elastomer insert and the externally threaded bearing bush are arranged coaxially with one another, and the externally threaded bearing bush is held by an internally threaded element on the respective other part of the camera housing or of the internal camera. If the externally threaded bearing bush is rotated inside the internally threaded socket after the loosening of the externally threaded pin, the internal camera and the movable camera parts can be aligned laterally with reference to the camera housing, and thus to the objective fastening.

This known device for soundproofing the internal camera and/or the camera frame from the camera housing requires constant readjustment at the sound absorbing connecting elements in order to ensure observance of the support dimension between the objective holder on the camera housing and the image plane on the camera frame.

DE 40 28 540 C2 discloses a device for soundproofing motion picture cameras having a soundproofing support of the camera frame carrying the noise-producing parts of the camera mechanism and the camera housing that has an objective carrier to which an exchangeable recording optics is fastened, and a number of sound insulating connecting elements are arranged between the camera frame and the camera housing for the purpose of the soundproofing support of the camera frame in the camera housing. In order, on the one hand, to observe the support dimension without readjustment and, on the other hand, to ensure optimum soundproofing, the sound insulating connecting elements have a directionally dependent inherent rigidity with a high, firmly defined and temperature-compensated rigidity in the direction of the support dimension between the objective plane of the camera housing and the image plane of the camera frame, as well as a low rigidity in the plane perpendicular thereto.

SUMMARY

It is an object of the present invention to provide a device of the type mentioned at the beginning that ensures optimum soundproofing without variation in the support dimension as a consequence of temperature fluctuations, and without the need for the readjustment of the support dimension.

The exemplary inventive solution ensures optimum soundproofing of the motion picture camera, that is to say both an optimum structure-borne noise insulation and a maximum air-borne noise insulation, without the means for soundproofing leading to a variation in the support dimension as a consequence of temperature fluctuations at the motion picture camera, or there being a need for the readjustment of the support dimension after changes in temperature.

The exemplary inventive solution enables an absorption of the air-borne and structure-borne noise, output by the camera frame, which carries the noise-producing devices of the motion picture camera, by connecting elements that are arranged and designed in such a way that given optimum sound insulation the support dimension between the objective plane formed on the camera housing and the image plane formed on the camera frame is not varied by variations in shape owing to temperature fluctuations, such that the support dimension is constant or depends only on the temperature-dependent changes in the material of the camera housing and/or of the camera frame.

Owing to the suspension of the camera frame in the direction of the transverse axis or Z-axis of the motion picture camera, that is to say perpendicular to the longitudinal axis or X-axis or optical axis of the motion picture camera, in which the recording beam path runs, and perpendicular to the vertical axis or Y-axis of the motion picture camera, on mutually aligned upper connecting elements, the camera frame can be pivoted about this upper suspension axis such that temperature fluctuations have an effect only in changes in length of the upper connecting elements in the direction of the Z-axis, and thus not on the support dimension of the motion picture camera running in the direction of the X-axis.

Given an alignment of the lower connecting element in the Y-direction, temperature fluctuations likewise have no effect on the support dimension of the motion picture camera running in the X-direction. Only in the case of a lower connecting element aligned in the X-direction, that is to say parallel to the recording beam path, do temperature fluctuations lead to a variation in the support dimension of the motion picture camera, but these are reduced by the measure of the clearance of the lower connecting element from the image window. The result of additional measures is that in the case of a lower connecting element aligned in the X-direction temperature fluctuations do not lead to variations in length of the lower connecting element, and thus do not lead to any variation in the support dimension as a consequence of changes in length of the connecting elements that are caused by temperature fluctuations.

Owing to the three-point suspension of the camera frame on the camera housing, on the one hand the camera frame is securely fixed on the camera housing, and thus a defined support dimension over the entire surface of the image window in the camera frame is ensured with reference to the objective carrier on the camera housing, and on the other hand the possibilities of the transmission of structure-borne noise from the camera frame onto the camera housing are minimized by a minimum of connecting points between the camera frame and the camera housing.

In an exemplary embodiment, the connecting elements contain buffer elements made from a polyurethane elastomer ("Eladur") that has excellent absorbing properties, but, with approximately $250 * 10^{-6}$ mm/mm° C., has a substantially higher coefficient of thermal expansion than aluminum, with approximately $21.6 * 10^{-6}$ mm/mm° C. or steel with approximately $10\text{-}16 * 10^{-6}$ mm/mm° C., so that, for example, a bushing-shaped buffer element with a height of 4 mm shrinks by approximately 0.04 mm ($4*40*250*10^{-6}=0.04$) in the event of a cooling from plus 20° C. to minus 20° C. The inventive frame suspension has the effect, however, that the support dimension is affected by such a change in length and volume either not at all or only slightly or, given a special structural formation of the lower connecting element, likewise not all.

The upper connecting elements, which are mutually aligned in the Z-direction, preferably have buffer elements that are connected to the camera housing and the camera frame and are interconnected by means of a pin forming a horizontal pivoting axis for the camera frame, each of the two connecting elements being able to have a dedicated pin that is aligned with the pin of the respective other connecting element, or a pin is provided that interconnects the two upper connecting elements and forms a continuous axle.

In a further exemplary refinement of the inventive solution, the upper connecting elements respectively have two buffer elements that are inserted into holders of the camera housing and of the camera frame, and lie against one another at the end face.

Owing to the alignment of at least one lower connecting element, arranged in the center plane of the motion picture camera, in the Y-direction, changes in length and volume of the connecting element as a consequence of temperature fluctuations do not lead to a variation in the support dimension. A connecting element aligned in the X-direction can be configured in such a way that the support dimension between the objective plane on the camera housing and the image plane on the camera frame is independent of the suspension of the camera frame on the camera housing in the event of temperature fluctuations.

In a first exemplary variant, the lower connecting element comprises two buffer elements, from which a first buffer element is arranged between one side of a flange, provided with a bore, of the camera frame and a cutout or a bore in the camera housing, and a second buffer element bears against the other side of the flange of the camera frame, and a screw that is plugged through bores of the buffer elements and the bore in the flange of the camera frame, bears against the second buffer element with a screw head, and is inserted into the cutout or bore in the camera housing in a force-closed or self-closed fashion, the screw preferably prestressing the buffer elements in the longitudinal direction of the screw.

In this embodiment, a change in length and volume of the buffer element has no effect on the support dimension, since the position of the screw extending through the bores of the buffer elements and the flange of the camera frame does not change with reference to the flange of the camera frame, on the one hand, and the cutout or bore in the camera housing that holds the screw, on the other hand, when the buffer elements bear with prestressing against the wall of the camera housing, the outer sides of the flange of the camera frame and of the screw head, so that in the event of a changing temperature only the prestressing, but not the length, of the buffer elements changes.

In order to set the prestressing of the buffer elements, it is possible either to arrange a spacer bushing between the screw head and the camera housing or the socket inserted into the cutout or bore in the camera housing, whose length is a measure of the prestressing of the buffer elements, or to provide a spring element in the direction of force lines between the screw head and the camera housing or the socket inserted into the cutout or bore in the camera housing.

In a further exemplary variant of the inventive solution, the camera housing has a connecting arm that is arranged below the image center of the motion picture camera, is directed into the interior of the housing of the motion picture camera, and has a terminal flange between which and the flange of the camera frame, the lower connecting element is arranged.

In this arrangement of the lower connecting element for suspending the camera frame on the camera housing, the effect of a change in length of the buffer elements in the X-direction is opposite to a change in length in the connecting arm of the camera housing directed into the interior of the housing of the motion picture camera, so that the changes in length of the buffer elements and of the connecting arm of the camera housing cancel one another out in the manner of a Rost pendulum in the event of temperature fluctuations, and as a result the total change in length of the lower suspension vanishes given appropriate design of the buffer elements and of the connecting arm.

In the variant in which the lower connecting element is aligned in the Y-direction, it is advantageous to form the lower connecting element from a buffer element that is inserted into a holder on the bottom of the camera housing and has a pin that is aligned parallel to the image plane of the motion picture camera, is connected to the camera frame, and is connected in a force-closed or self-closed fashion to the buffer element at a distance from the wall of the camera housing, or a screw.

In this embodiment, the pin makes contact neither with the camera housing nor with the camera frame, and so no sound bridge transmitting noise is formed. Moreover, owing to the alignment of the pin or the screw in the Y-direction a change in length of the pin or the screw and the buffer elements has no effect on the support dimension.

A further exemplary variant of the inventive solution is characterized in that the buffer elements have a radial expansion joint that is formed by a radial cut through the buffer elements or by removing a segment from the buffer elements.

In this variant of the inventive solution, the buffer elements are cut through in a radial direction, or a segment is cut out from the buffer elements, which have the shape of hollow cylinders or cylindrical rings, and thus an expansion joint is produced such that in the event of changes in temperature there is a change in the expansion joint of the buffer elements, but not in the position of the pin, which determines the position with reference to the bearing of the pin in the buffer elements, or the connecting points of the camera frame with the camera housing.

A further advantage of this variant of the inventive solution consists in that greater tolerances are possible for determining the prestressing of the buffer elements, these tolerances being used to keep the support dimension independent of the changes in length of the buffer elements.

BRIEF DESCRIPTION OF THE DRAWINGS

The aim is to use a number of exemplary embodiments illustrated in the drawing to explain more closely further features and advantages of the invention, as well as the idea on which the invention is based. In the figures:

FIG. 1 shows a longitudinal section through the front area of a motion picture camera, with a camera housing and a camera frame suspended in the camera housing.

FIG. 2 shows a cross section through the front area of the motion picture camera.

FIG. 3 shows an enlarged illustration of the lower suspension of the camera frame in the arrangement in accordance with FIGS. 1 and 2.

FIG. 7 shows an enlarged illustration of a buffer element, with an expansion joint formed as a radial cut through the buffer element.

FIG. 8 shows an enlarged illustration of a buffer element having an expansion joint formed as a cut out segment.

DETAILED DESCRIPTION

Figure 4:
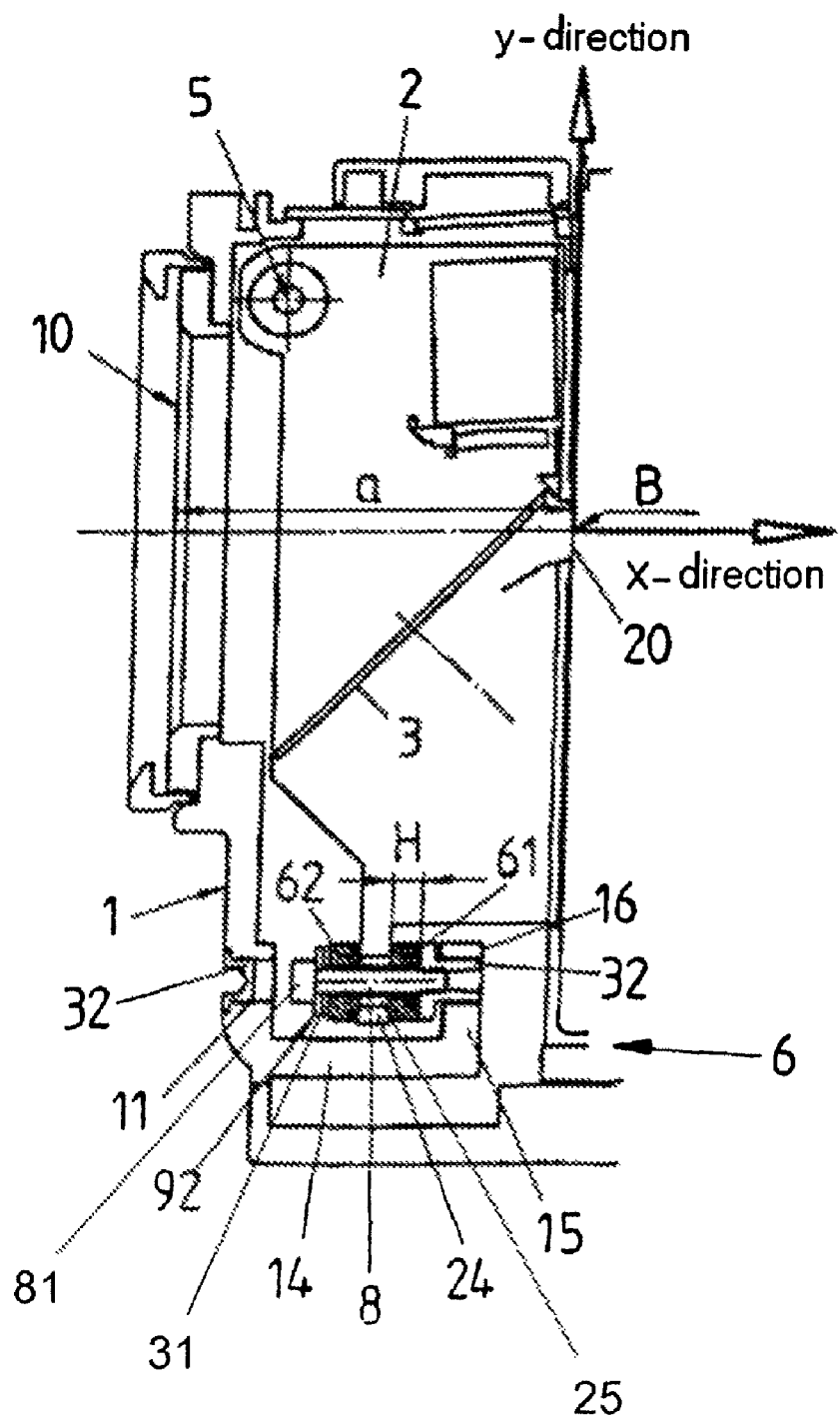
FIG. 4 shows a longitudinal section through the front area of a motion picture camera, with a lower suspension of the camera frame in the manner of a "Rost pendulum".
Figure 6:
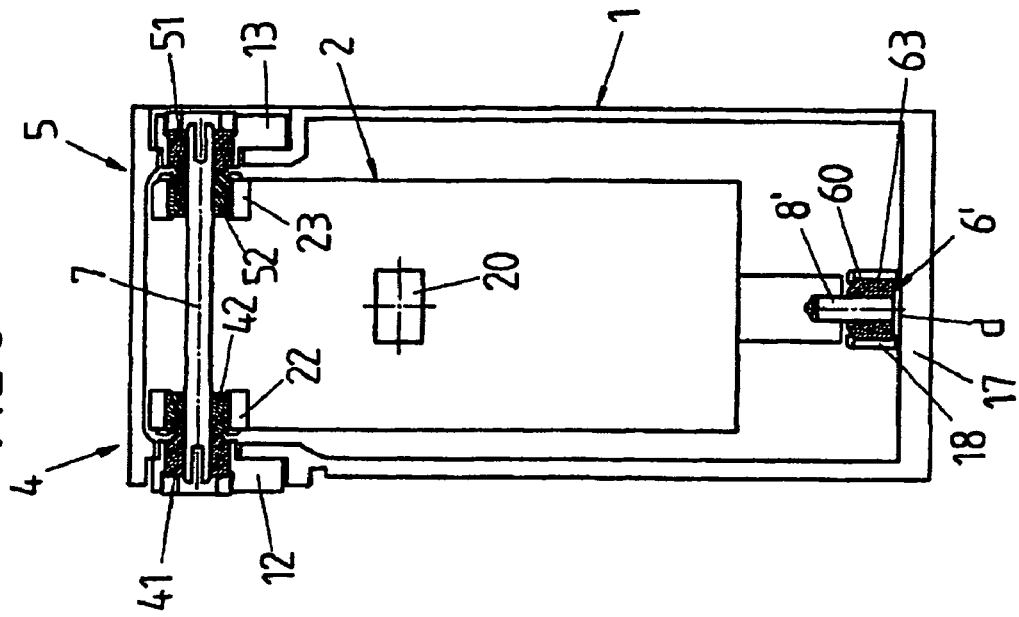
FIG. 6 shows a transverse section through the front area of a motion picture camera, with a camera housing and a camera frame suspended in the camera housing and having a variant of the lower suspension of the camera frame.

The front area, illustrated in the longitudinal section in FIG. 1 and in cross section in FIG. 2, of a motion picture camera has an outer camera housing 1 having a front objective carrier 10 with an objective fastening, forming an objective support, for holding an exchangeable camera objective. The optical axis of the camera objective forms the image center B (illustrated by dots and dashes) of the image to be recorded by the motion picture camera.

Arranged in the interior of the camera housing 1 is a camera frame 2 that contains all parts of the motion picture camera that move and therefore produce noise, such as a claw mechanism for the intermittent transport of a motion picture film F along an image window 20 that is arranged symmetrically in relation to the image center B, feeding and pickup devices for the continuous transport of the motion picture film F from a feed roll of a film cassette connected to the motion picture camera onto a take-up roll of the film cassette, and a rotating mirror diaphragm 3 (illustrated in FIG. 1) that releases the recording beam path for the exposure of the motion picture film F in the image window 20, or reflects it to an eyepiece and/or to an outwardly reflecting device.

The camera frame 2 is suspended in the camera housing 1 with the formation of an air gap between the camera housing 1 and the camera frame 2 so that the camera housing 1 shields the noises or sound waves produced on the camera frame 2 from the surroundings of the motion picture camera. This is achieved, firstly, by suitable measures that absorb the airborne noise between the camera frame 2 and the camera housing 1 and, secondly, in accordance with the subject matter of the present invention, by connecting elements 4, 5, 6 with the aid of which the camera frame 2 is suspended in the camera housing 1, and which are so constituted that they optimally absorb the structure-borne sound emanating from the camera frame 2 so that, in particular, no waves of structure-borne sound are output via the objective carrier 10 to the camera objective and are radiated from the latter to the surroundings of the motion picture camera.

Moreover, the connection of the camera frame 2 to the camera housing 1 is to be constituted such that the support dimension a, that is to say the clearance between the objective support 10 and the plane E of the image window 20 or the image plane is exactly met, since any displacement of the support dimension a results in instances of image blurring and inaccuracies of the image position of the film image projected onto the motion picture film F. Since an optimum absorption of the structure-borne sound emanating from the camera frame 2 is effected by connecting elements 4, 5, 6 between the camera housing 1 and the camera frame 2, which elements absorb the sound energy maximally and have a high elasticity in accordance therewith, while observing the constant support dimension a necessitates as rigid as possible a connection between the camera housing and the camera frame 2, it is necessary to suspend the camera frame 2 in the camera housing 1 to meet the two above named, mutually contradicting requirements.

In order to fulfill the two abovementioned requirements optimally, the camera frame 2 in accordance with FIG. 2 is connected to the camera housing 1 via three connecting elements 4, 5, 6 which are arranged at the front side of the motion picture camera and form the corner points of a triangle (isosceles in this exemplary embodiment), by which the upper connecting elements 4, 5 are arranged symmetrically relative to the two sides of a center plane M of the motion picture camera that is defined by the X-axis or longitudinal axis or optical axis of the motion picture camera in which the recording beam path A runs, and by the Y-axis or vertical axis of the motion picture camera. A lower connecting element 6 is arranged below the recording beam path A or the image center B in the center plane M. As an alternative thereto, the connecting elements 4, 5, 6 arranged on the front side of the motion picture camera can also connect the camera frame 2 to the camera housing 1 in another geometric configuration.

The upper connecting elements 4, 5 are therefore aligned in the Z-direction running perpendicular to the X- and Y-directions, that is to say in the direction of the transverse axis of the motion picture camera, and from a fulcrum or a pivoting axis about which the camera frame 2 can be pivoted with respect to the camera housing 1. The lower connecting element 6 forms a fixed point as suspension point that fixes the camera frame 2 in the set position with reference to the camera housing 1.

The connecting elements 4, 5, 6 contain buffer elements 41, 42; 51, 52; 61, 62 made from a polyurethane elastomer ("Eladur") having a central bore 40, 50, 60 and a pin 7, 8 extending through the central bore 40, 50, 60. The bushing-shaped buffer elements 41, 42 and 51, 52, respectively, of the upper connecting element 4, 5 are inserted into holders 12, 13 of the camera housing 1 and 22, 23, respectively, of the camera frame 2, and lie tightly against one another with their mutually facing end pieces. In the exemplary embodiment illustrated in FIGS. 1 and 2, the pin 7 is formed as a continuous axle that interconnects the two connecting elements 4, 5 and consequently forms a pivoting axis for the camera frame 2. Stoppers (not indicated further) are inserted from the outside into the holder 12, 13 of the camera housing 1 and seal the connecting elements 4, 5 from the outside of the motion picture camera.

The lower connecting element 6 illustrated in an enlarged fashion in FIG. 3 is aligned in the X-direction in accordance with FIG. 1 and likewise has two buffer elements 61, 62 with central bores 60 that bear on both sides against the outsides of a flange 24, having a bore 25, of the camera frame 2. A screw 8 extending through the central bores 60 of the buffer elements 61, 62 is screwed into a threaded bushing 30 that is arranged in an opening 11 on the front wall of the camera housing 1. The screw head 81 lies over a washer 31 on the outside of a buffer element 62 bearing against the flange 24 of the camera frame 2, such that the extent to which the screw 8 is screwed into the threaded bushing 30 causes prestressing of the buffer elements 61, 62 in an axial direction, that is to say in the X-direction.

Since the buffer element 61 of the lower connecting element 6 is arranged between the threaded bushing 30 connected to the front wall of the camera housing 1 and the flange 24 of the camera frame 2, temperature fluctuations lead to a change in the length and volume of the buffer element 61 in accordance with the coefficient of thermal expansion of the buffer element 61 consisting of a polyurethane elastomer. This change in length and volume of the buffer element 61 would lead to a displacement of the lower suspension point of the camera frame 2 that can pivot about the upper suspension axis formed by the pin 7.

Because of the arrangement of the connecting elements 4, 5, 6 at the corner points of an isosceles triangle, a change in length of the buffer element 61 and, in association therewith, a displacement of the lower suspension point would lead only to a reduced extent to a displacement of the image window 20 in the camera frame 2, that is to say of the image plane and thus of the support dimension a. For many applications, an only slight change in the support dimension a is entirely acceptable when taking account of the changes to the support dimension a which are accepted without additional measures and are caused by temperature-induced variations in the camera housing and the camera frame 2.

However, in order also to prevent such a change in the support dimension a caused by the lower connecting element 6, the screw 8 with its screw thread 80 is screwed into the threaded bushing 30 so far that the buffer elements 61, 62 are elastically prestressed in the direction of the longitudinal or optical axis of the motion picture camera, that is to say in the X-direction of the screw 8.

A prestressing of the buffer elements 61, 62 of the lower connecting element 6 has the effect that temperature fluctuations lead no longer to changes in the length and volume of the buffer elements 61, 62, but to a variation in the prestressing of the buffer elements 61, 62 and thus, in particular, of the buffer element 61 arranged between the flange 24 of the camera frame 2 and the front wall of the camera housing 1. As a consequence, there is no change in the position of the screw 8 plugged through the central bores 60 of the buffer elements 61, 62 with reference to the flange 24 of the camera frame 2 and the front wall of the camera housing 1, and so the support dimension a between the image plane 20 at the camera frame 2 and the objective support of the objective carrier 10 also does not vary.

The condition for this is a correct setting of the prestressing of the buffer elements 61, 62 of the lower connecting element 6 such that, on the one hand, the absorbing properties of the buffer elements 61, 62 are retained because of a not excessively high prestressing and, on the other hand, changes in length of the buffer elements 62, 62 cannot occur in the event of temperature fluctuations because of an excessively low prestressing.

In a first variant, in accordance with FIG. 3 there is provided, for the purpose of setting an optimum prestressing exactly, a spacer bushing 91 that is plugged through the central bores 60 of the buffer elements 61, 62 and the bore 25 in the flange 24 of the camera frame 2 and that bears at the end against the threaded bushing 30 connected to the front wall of the camera housing 1, and against the screw head 81 or the washer 31 arranged between the screw head 81 and the outer buffer element 62, and thereby determines the length to which the screw 8 is screwed into the threaded bushing 30 and, consequently, the prestressing of the buffer elements 61, 62.

In the event of temperature fluctuations, a change in the length and volume of the buffer elements 61, 62 therefore has the effect of raising or lowering the prestressing of the buffer elements 61, 62, but not of displacing the flange 24 of the camera frame 2, and thus of varying the support dimension a between the objective support at the camera housing 1 and the image plane at the camera frame 2.

Instead of a spacer bushing 91, in order to set the prestressing of the buffer elements 61, 62 in the case of a lower connecting element 6 aligned in the X-direction, it is possible to arrange a spring element in the form of a disk spring or a compression spring between the screw head 81 and the washer 31, the spring force of which determines the prestressing of the buffer elements 61, 62, with account being taken of its spring constants, when the spring element is not tightened until it stops.

In a longitudinal section through the front area of a motion picture camera, FIG. 4 shows a setting of the prestressing of the buffer elements 61, 62 in the case of a lower connecting element 6, aligned in the X-direction, by means of a spring element 92 that is arranged between the screw head 81 and the washer 31 bearing against the outer buffer element 62. The lower connecting element 6 is arranged between a connecting arm 14, of the camera housing 1, which is directed into the interior of the motion picture camera and from which a flange 15 having a bore 16 is bent away, and the flange 24 having the bore 25 of the camera frame 2. When the prestressing is correctly set by means of the spring element 92, the length or height of the buffer element 61 arranged between the flange 24 of the camera frame 2 and the flange 15 of the camera housing 1 does not change in the event of temperature fluctuations, but leads to an increase or decrease in the prestressing of the buffer element 61.

Because of the special configuration of the connection of the lower connecting element 6 to the camera housing 1, the change in length of the components interconnected at the lower suspension point of the camera frame 2 resulting from temperature fluctuations can be set such that the resulting total change in length vanishes, that is to say does not lead to a displacement of the lower suspension point of the camera frame 2, nor thus to a change in the support dimension a between the objective support at the camera housing 1 and the image plane at the camera frame 2.

Such a displacement of the lower suspension point of the camera frame 2 at the camera housing 1 can result from an insufficiently dimensioned prestressing of the buffer elements 61, 62 by means of the spring element 92 or of a prestressing set without a spring element 92 or spacer bushing 91. However, it can also be specifically set with or without a set prestressing of the buffer elements 61, 62, with account being taken of the changes in length of the camera housing 1 and of the camera frame 2, by virtue of the fact that changes in length of the lower connecting element 6 are compensated in such a way by the changes, put about by temperature changes, in the camera housing 1 and in the camera frame 2 that the changes in length of the buffer elements 61, 62 and the connecting arm 14 of the camera housing 1, which act in different directions, neutralize one another in the manner of a Rost pendulum, and thus lead to a total change in length of zero. Given appropriate design of the material properties and dimensions of the components of the lower suspension point of the camera frame 2, it is thereby possible for an invariable position of the lower suspension point of the camera frame 2 on the camera housing 1, and thus a constant support dimension a between the objective support at the camera housing 1 and the image plane at the camera frame 2, to be set, at least in a prescribed temperature range.

Figure 5:
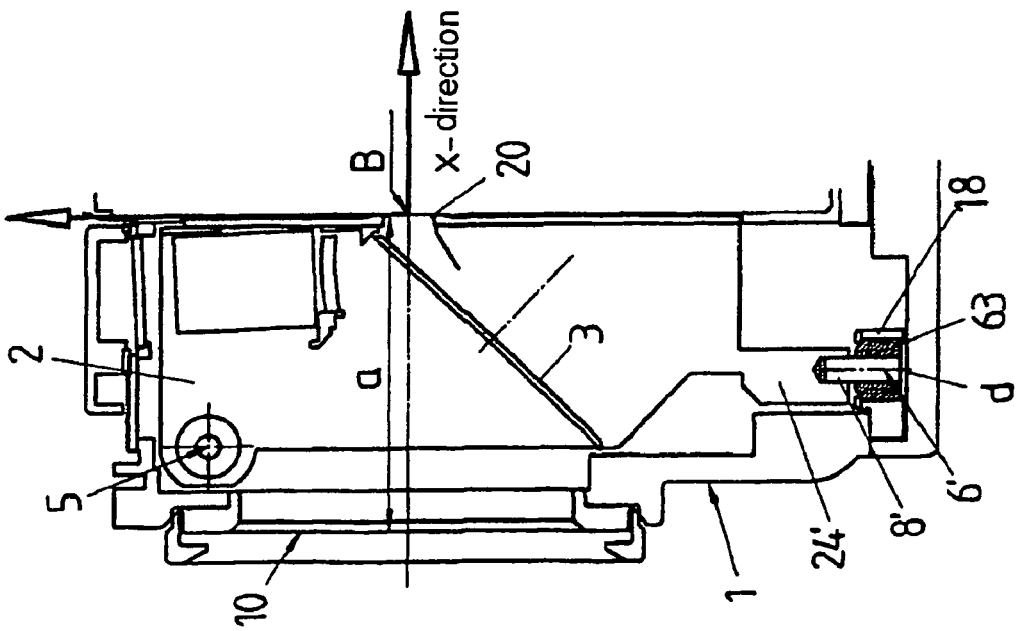
FIG. 5 shows a longitudinal section through the front area of a motion picture camera, with a camera housing and a camera frame suspended in the camera housing and having a variant of the lower suspension of the camera frame.

FIG. 5 shows an embodiment of the invention in the case of which a lower connecting element 6' is aligned in the Y-direction such that changes in length of the connecting element 6' do not lead to a displacement of the lower suspension point of the camera frame 2 on the camera housing 1, and thus to a variation in the support dimension a between the objective support at the camera housing 1 and the image plane at the camera frame 2.

In the embodiment in accordance with FIG. 5, the lower connecting element 6' is formed in accordance with the upper connecting elements 4, 5, and has a buffer element 63 that is inserted into a holder 18 connected to the bottom 17 of the camera housing 1 and through whose central bore 60 there is plugged a pin or a screw 8' of which the end facing the camera housing 1 has a clearance d from the bottom 17 of the camera housing 2 and is inserted into a bore in a flange 24' of the camera frame 2. The pin 8' can be integrated in the buffer element 63, in which, for example, the buffer element 63 is integrally formed on the pin 8', in particular vulcanized on. This arrangement and configuration of the lower suspension point of the camera frame 2 on the camera housing 1 thus makes sure of a constant support dimension a on the one hand, while on the other hand ensuring that the structure-borne noise emanating from the camera frame 2 is absorbed by the buffer element 63 that produces the sole lower connection between the camera frame 2 and the camera housing 1.

In order to prevent volume changes in the buffer elements 41, 42; 51, 52; 61, 62, 63 that lead to changes in length or displacements of the buffer elements 41, 42; 51, 52; 61, 62, 63, it is possible in addition to take the measures illustrated in FIGS. 7 and 8, with the aid of which volume changes in the buffer elements 41, 42; 51, 52; 61, 62, 63 are brought under control.

FIG. 7 shows by way of example in an enlarged illustration the outer buffer element 51 of the upper connecting element 5 with the bore 50 holding the pin or the pivoting axis 7. A radial cut 53 through the buffer element 51, in the form of a hollow cylinder or cylindrical ring, produces an "expansion joint" whose size varies in the event of temperature changes acting on the buffer element 51. If, for example, the buffer element 51 is designed for a maximum temperature of 40° C., in the event of a temperature reduction, the radial cut 53 through the buffer element 51 causes the cut 53 to open up such that the cut surface 53' illustrated by dots and dashes is spaced apart from the other cut surface 53 in the circumferential direction.

Since a radial cut through the buffer element is essentially active only in the opening up of the cut surfaces in the event of a temperature reduction, whereas in the event of a temperature rise the cut surfaces are merely compressed more strongly, an even better result can be achieved in accordance with FIG. 8 by cutting out from the buffer element 51 a segment 54 that reacts both to a temperature reduction and to a temperature rise with a variation in the segment width. Whereas in the case of a reduction in the ambient temperature the spacing of the cut ends 54', 54" of the cut out segment 54 increases as a consequence of the volume reduction of the buffer element 51, which is dependent on the coefficient of thermal expansion and the measure of the temperature reduction, the segment width decreases in the event of a rise in ambient temperature in accordance with the above criteria.

Particularly in conjunction with a prestressing of the buffer elements 41, 42; 51, 52; 63 and, in particular, of the buffer elements 61, 62, the expansion joint illustrated in FIGS. 7 and 8 leads to an enhanced tolerance of the prestressing of the buffer elements, since temperature changes do not act by a change in volume of the buffer elements on their change in length, and so no change occurs in the support dimension a even when prestressing of the lower connecting element 6 or 6' is not set exactly.

In conjunction with the buffer elements 41, 42 and 51, 52 of the upper connecting elements 4, 5, the expansion joint in accordance with FIGS. 7 and 8 leads to the fact that changes in volume of these buffer elements do not lead to a displacement in the pins 7 or pin axles 7 plugged through the bores 40, 50 of the buffer elements 41, 42; 51, 52.

The invention claimed is:

1. A motion picture camera having a camera housing that has an objective carrier which is arranged in a recording beam path of the motion picture camera and on which a recording optics can be fastened, said camera having a camera frame that is arranged in the camera housing and which carries noise-producing parts of a camera mechanism, said frame forming an image plane for a motion picture film, and being suspended on the camera housing with at least two upper connecting elements arranged in a front area of the motion picture camera above and on both sides of an image center of the motion picture camera, and being supported on the camera housing with a lower connecting element arranged in the front area of the motion picture camera below the image center, and having a device for soundproofing, wherein the upper connecting elements comprise buffer elements made from an elastomer and a pin that is plugged through the buffer elements and connects the buffer elements to the camera housing and the camera frame, and the lower connecting element comprising buffer elements made from an elastomer, and a screw or a pin that is plugged through the buffer elements and connects the buffer elements to the camera housing and the camera frame, wherein the buffer elements of the upper connecting elements are interconnected by means of in each case a pin aligned with a respective other pin, or by means of a pin that interconnects the buffer elements of the upper connecting elements and forms a continuous axle, and in that the pin or the pins, respectively, forms or form a horizontal pivoting axis for the camera frame.

2. The device of claim 1, wherein the upper connecting elements respectively have two buffer elements that are inserted into holders of the camera housing and of the camera frame, and lie against one another at an end face.

3. The device of claim 1, wherein the upper connecting elements are aligned in a direction of a transverse axis of the motion picture camera, and the lower connecting element is aligned in a direction of a longitudinal or optical axis or in the direction of a vertical axis of the motion picture camera.

4. The device of claim 1, wherein the buffer elements contain a sound insulating plastic.

5. The device of claim 1, wherein a support dimension between an objective support of the camera housing and an image window of the camera frame is substantially independent of a suspension of the camera frame on the camera housing in the event of temperature fluctuations.

6. The device of claim 5, wherein the lower connecting element comprises two buffer elements, from which a first buffer element is arranged between one side of a flange, provided with a bore, of the camera frame and a cutout or a bore in the camera housing, and a second buffer element bears against another side of the flange of the camera frame, wherein a screw that is plugged through bores of the buffer elements and the bore in the flange of the camera frame and bears against the second buffer element with a screw head, and is inserted into the cutout or bore in the camera housing in a non-positive-locking or positive-locking fashion.

7. The device of claim 6, wherein the screw elastically prestresses the buffer elements in the longitudinal direction of the screw.

8. The device of claim 6, wherein the screw has a screw thread and is screwed into a socket having an internal thread and inserted into the cutout or bore in the camera housing.

9. The device of claim 6, wherein arranged between the screw head and the camera housing is a spacer bushing whose length is a measure of a prestressing of the buffer elements.

10. The device of claim 6, wherein a spring element determining a prestressing of the buffer elements is arranged in a direction of force lines between the screw head and the camera housing.

11. The device of claim 6, wherein the camera housing has a connecting arm that is arranged below the image center of the motion picture camera, is directed into the interior of the housing of the motion picture camera, and has a terminal flange between which and the flange of the camera frame, the lower connecting element is arranged.

12. The device of claim 1, wherein the lower connecting element comprises one of the buffer elements inserted into a holder on the bottom of the camera housing, and the screw or the pin that is aligned in the direction of the vertical axis of the motion picture camera, is connected to the camera frame, and is connected in a force-closed or self-closed fashion to the one of the buffer elements at a distance from the bottom of the camera housing.

13. The device of claim 1, wherein the buffer elements have a radial expansion joint.

14. The device of claim 13, wherein the expansion joint is formed by a radial cut through the buffer elements.

15. The device of claim 14, wherein the expansion joint is formed by removing a segment from the buffer elements.

16. The device of claim 14, wherein said sound insulating plastic comprises a polyurethane elastomer.

17. The device of claim 8, wherein arranged between the screw head and the socket is a spacer bushing whose length is a measure of a prestressing of the buffer elements.

18. The device of claim 8, wherein a prestressing of the buffer elements is arranged in a direction of force lines between the screw head and the socket.

\* \* \* \* \*